US 12,459,225 B2

(12) United States Patent
Goodrich (10) Patent No.: US 12,459,225 B2
(45) Date of Patent: Nov. 4, 2025

(54) SLIT SHEET TENSIONING DEVICE (71) Applicant: David Paul Goodrich, Sedona, AZ (US)

(72) Inventor: David Paul Goodrich, Sedona, AZ (US)

(73) Assignee: HexcelPack, LLC, Sedona, AZ (US)

(*) Notice: Subject to any disclaimer, the term of this patent is extended or adjusted under 35 U.S.C. 154(b) by 236 days.

(21) Appl. No.: 17/959,928

(22) Filed: Oct. 4, 2022

(65) Prior Publication Data
US 2023/0022433 A1 Jan. 26, 2023

Related U.S. Application Data (60) Continuation-in-part of application No. 17/572,174, filed on Jan. 10, 2022, and a continuation of
(Continued)

(51) Int. Cl.
*B31D 5/00* (2017.01)
*B65H 16/00* (2006.01)
(Continued)

(52) U.S. Cl.
CPC ......... *B31D 5/0065* (2013.01); *B65H 16/005* (2013.01); *B65H 23/063* (2013.01);
(Continued)

(58) Field of Classification Search
CPC ...... B65H 59/04; B65H 23/06; B65H 23/063; B65H 23/08; B65H 23/1825;
(Continued)

(56) References Cited

U.S. PATENT DOCUMENTS 10,004 A * 9/1853 Morse ..................... F16D 49/00
188/235
40,156 A * 10/1863 Bing ....................... F16D 49/00
188/235
(Continued)

FOREIGN PATENT DOCUMENTS

CN 107921724 A 4/2018
CN 109531702 A * 3/2019 ............... B26D 7/00
(Continued)

OTHER PUBLICATIONS

Invalidity contentions filed in *HexcelPack, LLC v. Pregis LLC*, Case No. 23-cv-15282, Northern District of Illinois regarding related U.S. Pat. No. 11,479,009 (Feb. 22, 2024).
(Continued)

*Primary Examiner* — Robert F Long
*Assistant Examiner* — Eduardo R Ferrero
(74) *Attorney, Agent, or Firm* — Studebaker Brackett PC (57) ABSTRACT An expansion device includes an unexpanded slit sheet roll that is wound on a paper core that is longer than the width of the slit sheet paper roll. The paper core is placed onto a rod member. An adjustable downward pressure is exerted on the paper core and the paper core exerts pressure on the rod member. As the paper is pulled, the downward pressure creates the friction required to enable the unexpanded slit, sheet to be unwind and fed while simultaneously expanding.

55 Claims, 7 Drawing Sheets

Related U.S. Application Data application No. 16/290,016, filed on Mar. 1, 2019, now Pat. No. 11,479,009, said application No. 17/572,174 is a division of application No. 15/820,514, filed on Nov. 22, 2017, now Pat. No. 11,220,395, said application No. 16/290,016 is a continuation-in-part of application No. 15/820,514, filed on Nov. 22, 2017, now Pat. No. 11,220,395, application No. 17/959,928 is a continuation-in-part of application No. 15/428,144, filed on Feb. 8, 2017, now Pat. No. 11,608,222, said application No. 16/290,016 is a continuation-in-part of application No. 15/428,144, filed on Feb. 8, 2017, now Pat. No. 11,608,222, said application No. 15/820,514 is a continuation-in-part of application No. 15/001,168, filed on Jan. 19, 2016, now abandoned.

(60) Provisional application No. 62/641,352, filed on Mar. 11, 2018, provisional application No. 62/571,382, filed on Oct. 12, 2017, provisional application No. 62/435,037, filed on Dec. 15, 2016, provisional application No. 62/425,200, filed on Nov. 22, 2016, provisional application No. 62/292,727, filed on Feb. 8, 2016.

(51) Int. Cl.
*B65H 23/06* (2006.01)
*B65H 23/08* (2006.01)

(52) U.S. Cl.
CPC ..... *B65H 23/08* (2013.01); *B31D 2205/0023* (2013.01); *B31D 2205/0047* (2013.01)

(58) Field of Classification Search
CPC .......... B65H 2403/725; B65H 2801/63; B31D 5/0065; B31D 2205/0023; B31D 2205/0047; B65B 5/04; B65B 11/004; B65B 41/12; B65B 16/005
See application file for complete search history.

(56) References Cited

U.S. PATENT DOCUMENTS

| | | | | |
|---|---|---|---|---|
| 44,740 A * | 10/1864 | Otis | ............... | F16D 49/00 477/199 |
| 62,940 A * | 3/1867 | Countiss | ............... | F16D 49/00 188/235 |
| 71,591 A * | 12/1867 | Dunham et al. | ............... | F16D 49/00 188/235 |
| 382,464 A * | 5/1888 | Farr | ............... | B65H 59/04 242/156 |
| 745,359 A * | 12/1903 | Larson | ............... | F16D 49/00 188/235 |
| 761,167 A * | 5/1904 | Hardy | ............... | A01K 89/033 188/186 |
| 847,977 A * | 3/1907 | Ballard | ............... | B65H 59/04 352/159 |
| 918,636 A * | 4/1909 | Young | ............... | F16D 49/00 16/35 R |
| 988,464 A * | 4/1911 | Hallot | ............... | F16D 49/00 188/79 |
| 1,204,267 A * | 11/1916 | Giba | ............... | F16D 49/00 70/226 |
| 1,267,995 A * | 5/1918 | Fend | ............... | F16D 49/00 280/124.105 |
| 1,270,279 A * | 6/1918 | Ferres | ............... | B65H 23/06 242/421.3 |
| 1,327,046 A * | 1/1920 | Henry | ............... | F16D 49/00 188/164 |
| 1,327,656 A * | 1/1920 | Harcourt | ............... | F16D 49/00 188/70 R |
| 1,332,654 A * | 3/1920 | Webber | ............... | B65H 59/04 112/254 |
| 1,340,710 A * | 5/1920 | Wallace | ............... | G03B 21/321 242/423.2 |
| 1,364,259 A * | 1/1921 | Eaton | ............... | B65H 59/04 242/129.8 |
| 1,452,528 A * | 4/1923 | Rohlfing | ............... | F16D 49/00 188/161 |
| 1,472,751 A * | 10/1923 | Goulet | ............... | F16D 49/00 188/74 |
| 1,605,276 A * | 11/1926 | Peterson | ............... | B65H 59/04 242/156.1 |
| 1,640,760 A * | 8/1927 | Emery | ............... | D01H 7/16 242/156 |
| 1,710,425 A * | 4/1929 | Lorimer | ............... | F16D 49/00 477/208 |
| 1,715,385 A * | 6/1929 | Pinkney | ............... | F16D 49/00 188/382 |
| 1,733,834 A * | 10/1929 | Steele | ............... | B65H 59/04 28/194 |
| 1,875,153 A * | 8/1932 | Richter | ............... | B65H 23/06 242/422.9 |
| 1,888,549 A * | 11/1932 | Crafts | ............... | B65H 23/06 242/422.9 |
| 2,033,578 A * | 3/1936 | Kittel | ............... | B65H 23/06 242/914 |
| 2,081,898 A * | 6/1937 | Blewett | ............... | F16D 49/00 188/74 |
| 2,213,764 A * | 9/1940 | Wlfgang | ............... | A47F 13/04 242/129.51 |
| 2,498,336 A * | 2/1950 | Kennedy | ............... | B65H 23/06 242/422.4 |
| 2,972,452 A * | 2/1961 | Aumann | ............... | B65H 59/04 242/422.9 |
| 3,357,347 A * | 12/1967 | Nesin | ............... | B65H 23/14 242/421.8 |
| 3,503,567 A | 3/1970 | Casey | | |
| 3,563,122 A * | 2/1971 | De Neui | ............... | B65H 35/0006 83/276 |
| 3,602,452 A * | 8/1971 | Sauer | ............... | B65H 23/08 242/422.4 |
| 3,734,424 A * | 5/1973 | Ulseth | ............... | B65H 23/06 242/422.9 |
| 3,738,588 A * | 6/1973 | Ayers | ............... | B65H 23/06 242/594 |
| 3,850,379 A * | 11/1974 | Stern | ............... | A47K 10/40 242/598.5 |
| 3,866,851 A * | 2/1975 | Brooks | ............... | B65H 23/063 242/422.4 |
| 3,913,855 A * | 10/1975 | Heimlicher | ............... | B65H 23/063 242/422.1 |
| 3,940,089 A * | 2/1976 | Lindquist | ............... | B65H 59/04 112/229 |
| 4,002,238 A * | 1/1977 | Cameron | ............... | G11B 23/107 206/416 |
| 4,099,601 A * | 7/1978 | Pittman | ............... | F16D 59/00 192/70.15 |
| 4,116,749 A * | 9/1978 | Dufort | ............... | B29C 43/22 439/5 |
| 4,121,783 A * | 10/1978 | Wolfinger | ............... | B65H 75/08 242/596.7 |
| 4,190,211 A * | 2/1980 | Janzen | ............... | B65H 49/32 242/599.3 |
| 4,238,065 A * | 12/1980 | Ragsdale | ............... | B65D 85/672 225/48 |
| 4,304,369 A * | 12/1981 | Landsness | ............... | B65H 23/06 242/422.4 |
| 4,336,911 A | 6/1982 | Fairchild | | |
| 4,411,393 A * | 10/1983 | Jodrey | ............... | B41F 16/00 226/29 |
| 4,477,037 A * | 10/1984 | Goldstein | ............... | B65B 67/085 242/588 |
| 4,625,931 A * | 12/1986 | Tamura | ............... | B65H 16/04 242/597.5 |
| 4,649,693 A * | 3/1987 | Yeager | ............... | B65B 67/10 242/595.1 |

(56) References Cited

U.S. PATENT DOCUMENTS

| | | | | |
|---|---|---|---|---|
| 4,679,745 A * | 7/1987 | Kim | ............... | G11B 15/32 |
| | | | | 242/325 |
| 4,706,442 A * | 11/1987 | Riemenschneider | ............... | |
| | | | | B65B 67/085 |
| | | | | 242/588.2 |
| 4,715,519 A * | 12/1987 | Fischer | ............... | B65D 85/672 |
| | | | | 225/80 |
| 4,742,973 A * | 5/1988 | Stomski | ............... | B65H 59/04 |
| | | | | 242/156 |
| 4,759,511 A * | 7/1988 | Kuhlmann | ............... | G03B 27/587 |
| | | | | 242/332.7 |
| 4,946,113 A * | 8/1990 | Riffle | ............... | B65H 49/325 |
| | | | | 280/449 |
| 4,998,656 A * | 3/1991 | Hurh | ............... | B65D 85/672 |
| | | | | 225/50 |
| 5,279,472 A * | 1/1994 | Hongo | ............... | B65H 16/02 |
| | | | | 242/422.5 |
| 5,314,136 A * | 5/1994 | Vaida | ............... | B65H 23/06 |
| | | | | 242/422.4 |
| 5,322,201 A * | 6/1994 | Garr | ............... | B65H 35/002 |
| | | | | 225/53 |
| 5,538,778 A | 7/1996 | Hurwitz et al. | | |
| 5,564,645 A * | 10/1996 | Lissoni | ............... | B65H 23/06 |
| | | | | 242/423.1 |
| 5,630,563 A * | 5/1997 | Meisner | ............... | B65H 35/002 |
| | | | | 242/598.6 |
| 5,667,871 A | 9/1997 | Goodrich et al. | | |
| 5,688,578 A | 11/1997 | Goodrich | | |
| 5,725,175 A * | 3/1998 | Thundathil | ............... | B65H 59/04 |
| | | | | 242/594.3 |
| 5,755,397 A * | 5/1998 | Freese | ............... | A47K 10/38 |
| | | | | 242/423.1 |
| 5,758,841 A * | 6/1998 | Ayffre | ............... | B65H 75/245 |
| | | | | 242/571.5 |
| 5,782,735 A | 7/1998 | Goodrich et al. | | |
| 5,868,350 A * | 2/1999 | Christie | ............... | B65H 23/16 |
| 5,961,066 A * | 10/1999 | Hambleton | ............... | B65H 35/0026 |
| | | | | 224/267 |
| 6,042,039 A * | 3/2000 | Furuya | ............... | B41J 35/08 |
| | | | | 242/348 |
| 6,102,322 A * | 8/2000 | Cordes | ............... | B65H 23/1955 |
| | | | | 242/534 |
| 6,199,786 B1 * | 3/2001 | Lessard | ............... | B65H 75/44 |
| | | | | 242/563.2 |
| 6,244,530 B1 * | 6/2001 | Imai | ............... | G03B 27/588 |
| | | | | 242/160.4 |
| 6,564,942 B1 * | 5/2003 | Shiffler | ............... | B65D 83/0805 |
| | | | | 242/588.4 |
| 6,871,480 B1 | 3/2005 | Goodrich | | |
| 6,929,213 B1 * | 8/2005 | Contreras | ............... | B65H 35/002 |
| | | | | 225/80 |
| 7,043,888 B2 * | 5/2006 | Gerulski | ............... | B65D 83/0805 |
| | | | | 206/397 |
| 7,909,284 B2 * | 3/2011 | Burns | ............... | B23K 9/133 |
| | | | | 242/423.1 |
| RE45,846 E | 1/2016 | Yuyama | ............... | B65H 75/10 |
| 9,670,028 B1 * | 6/2017 | Pinto | ............... | B65H 35/0033 |
| 9,701,091 B2 * | 7/2017 | Page | ............... | B65H 23/06 |
| 10,227,195 B2 | 3/2019 | Page et al. | | |
| 11,220,395 B2 * | 1/2022 | Goodrich | ............... | B65D 5/106 |
| 11,479,009 B2 | 10/2022 | Goodrich | | |
| 11,504,937 B2 * | 11/2022 | Cheich | ............... | B65H 23/14 |
| 12,115,752 B2 * | 10/2024 | Goodrich | ............... | B31D 5/0065 |
| 12,291,392 B2 | 5/2025 | Goodrich | | |
| 2001/0034998 A1 | 11/2001 | Yamaai et al. | | |
| 2002/0166917 A1 * | 11/2002 | Eagelman | ............... | B65H 59/04 |
| | | | | 242/421.7 |
| 2004/0084559 A1 * | 5/2004 | Fraser | ............... | B65H 23/063 |
| | | | | 242/422.4 |
| 2009/0081416 A1 | 3/2009 | Goodrich | | |
| 2009/0082187 A1 * | 3/2009 | Cheich | ............... | B31D 5/0052 |
| | | | | 53/472 |
| 2009/0233023 A1 | 9/2009 | Goodrich | | |
| 2010/0054837 A1 * | 3/2010 | Sakai | ............... | B65H 16/06 |
| | | | | 400/613 |
| 2011/0309125 A1 * | 12/2011 | Kuchar | ............... | B31D 3/002 |
| | | | | 226/195 |
| 2013/0240657 A1 | 9/2013 | Kuchar et al. | | |
| 2013/0272767 A1 * | 10/2013 | Tanaka | ............... | B65H 16/04 |
| | | | | 242/597 |
| 2014/0027553 A1 | 1/2014 | Page et al. | | |
| 2014/0208696 A1 * | 7/2014 | Phillips | ............... | B65B 41/12 |
| | | | | 53/461 |
| 2015/0122866 A1 | 5/2015 | Kuchar et al. | | |
| 2015/0165717 A1 | 6/2015 | Page et al. | | |
| 2016/0067938 A1 | 3/2016 | Goodrich | | |
| 2016/0101960 A1 * | 4/2016 | Lam | ............... | B65H 35/0033 |
| | | | | 156/577 |
| 2016/0130104 A1 | 5/2016 | Page et al. | | |
| 2016/0318320 A1 * | 11/2016 | Kokuta | ............... | B41J 15/046 |
| 2017/0203866 A1 | 7/2017 | Goodrich | | |
| 2017/0305173 A1 * | 10/2017 | Onodera | ............... | B65H 23/16 |
| 2018/0099834 A1 * | 4/2018 | Madrid | ............... | B65H 75/02 |
| 2018/0222665 A1 * | 8/2018 | Goodrich | ............... | B65D 5/02 |
| 2018/0236742 A1 * | 8/2018 | Cheich | ............... | B31D 5/0065 |
| 2018/0281336 A1 * | 10/2018 | Cheich | ............... | B31D 5/0065 |
| 2018/0370702 A1 * | 12/2018 | Goodrich | ............... | B31D 5/0069 |
| 2019/0248092 A1 * | 8/2019 | Goodrich | ............... | B31D 5/0065 |
| 2019/0291481 A1 * | 9/2019 | Yazawa | ............... | B65H 23/085 |

FOREIGN PATENT DOCUMENTS

| | | | | |
|---|---|---|---|---|
| EP | 2 874 806 A1 | 5/2015 | | |
| GB | 2069457 A | 8/1981 | | |
| WO | WO-9626144 A1 * | 8/1996 | ............. | B65H 23/06 |
| WO | WO-2013178331 A1 * | 12/2013 | ............. | A23G 1/18 |
| WO | 2014014905 A1 | 1/2014 | | |
| WO | WO-2014079359 A1 * | 5/2014 | ............. | B65H 23/06 |
| WO | 2017039792 A1 | 3/2017 | | |
| WO | 2017074535 A1 | 5/2017 | | |

OTHER PUBLICATIONS

An Office Action issued by IP Australia on Jan. 24, 2024, which corresponds to Australian Patent Application No. 2019349561 and is related to U.S. Appl. No. 17/959,928.

The extended European search report issued by the European Patent Office on Nov. 18, 2021, which corresponds to European Patent Application No. 19919546.2-1017 and is related to U.S. Appl. No. 16/290,016.

An Office Action mailed by China National Intellectual Property Administration on Jan. 6, 2022, which corresponds to Chinese Patent Application No. 201980043174.7; with English language translation (23 pages).

The extended European search report issued by the European Patent Office on Jan. 4, 2022, which corresponds to European Patent Application No. 19795837.4-1017 ( 9 pages).

First Examination Report issued in IN 202017047236; mailed by the Intellectual Property India on Jun. 1, 2022.

International Search Report dated Aug. 20, 2020, issued in counterpart PCT/IB2019/001458 (2 pages).

International Preliminary Report on Patentability (Form PCT/IB/373) issued in counterpart International Application No. PCT/IB2019/001458 mailed Sep. 15, 2020 with Form PCT/ISA/237 and PCT/IB/326. (6 pages).

Office Action dated Dec. 15, 2021, issued in counterpart IN Application No. 202017043805. (5 pages).

* cited by examiner

SLIT SHEET TENSIONING DEVICE

BACKGROUND OF THE INVENTION

CROSS-REFERENCE TO RELATED APPLICATIONS

This application claims the benefit of provisional application 62/641,352, filed Mar. 11, 2018 and is a continuation-in-part of non-provisional patent application Ser. No. 15/428,144 filed Feb. 8, 2017, and is a continuation-in-part of non-provisional patent application 151820,514, filed, Jan. 2, 2018, the disclosures of which are incorporated by reference in their entirety, referenced and recited herein as if in full as part of the description of the present invention. The disclosures of patent application Ser. No. 14/480,319 filed Sep. 8, 2014 (US2016-0067938), and 15/001,168 filed Jan. 19, 2016, (US2018/0222665) are incorporated herein by reference, as though recited in full.

FIELD OF THE INVENTION

This invention relates to the use of a tensioning device for resisting the unwinding of a roll of slit, expandable paper during the dispensing of expanded slit sheet material.

DESCRIPTION OF THE PRIOR ART

The expanded slit paper prior art is disclosed in U.S. Pat. Nos. 5,538,778, 5,667,871, 5,688,578, and 5,782,735, which patents are incorporated by reference in their entirety and recited herein as if in full as part of the description of the present invention. The prior art consists of layering, a slit sheet wrapping a combination of a tissue interleave sheet for the purpose of cushioning fragile items for shipment. The prior art also relates to a method of expanding the slit sheet material using an electrically powered apparatus.

SUMMARY OF THE INVENTION

A main object of the present invention is to overcome the shortcomings of the prior art as mentioned in a paragraph above. In accordance with a broad embodiment of the invention, provides a simplified solution to already existing hardware that can support a roll of expanded slit sheet material that only requires the tensioning device.

In accordance with an embodiment of the invention, an expansion device is provided that includes an unexpended slit sheet roll that is wound on a paper core that is longer than the width of the slit sheet paper roll. The paper core is placed onto a rod member. An adjustable downward pressure is exerted on the paper core and the paper core exerts pressure on the rod member. As the paper is pulled, the downward pressure creates the friction required to enable the unexpanded slit sheet to, be unwind and fed while simultaneously expanding.

In accordance with another embodiment of the invention, a device for dispensing expandable slit sheet paper includes a roll of expandable slit sheet paper wound on an interior core member, and mounted on a rod member, said rod member having a rod member end region, a support member, first means for securing, the rod member end region to the support member, and means for pressing the core end region against the rod member end region and for variably applying a frictional resistance to the rotation of said core member.

In accordance with a further embodiment of the invention, the interior core member has an axial length that is greater than the width of the slit sheet paper that is wound on said interior core member and has a core member end region that extends beyond the roll of expandable slit sheet paper. The rod member can have four right angle corners.

In accordance with another further embodiment of the invention, a tensioning means is provided for variably applying a frictional resistance to the rotation of said interior core member. Preferably the tensioning means includes an elongated member hingedly coupled to a support member, a spring, a threaded region in said support member, and a screw member that passes through the spring and is in threaded engagement with the threaded insert. The screw member is rotatable to vary the frictional resistance applied by said elongated member to a core member end region.

In accordance with still another embodiment of the invention, a means is provided for variably applying a frictional resistance to the rotation of said interior core member and a rod member is provided having four right angle corners and received within an opening in a support member. The opening is rectangular and dimensioned to receive the rod member, and having a threaded member for releasably fastening said rod member to said support member.

In accordance with an embodiment of the invention, a device for dispensing expandable slit sheet paper includes a roll of expandable slit sheet paper wound on an interior core member and mounted on a rod member. The rod member has a rod member end region. The end region of said interior core member extending beyond the width of said roll of slit sheet paper, advantageously by an amount of at least one inch from said roll of slit sheet paper and preferably at least about one and one half inches from said roll of slit sheet paper. The device further includes a support member and a threaded member for releasably fastening the rod member to the support member.

In accordance with another embodiment of the invention, a device for dispensing expandable slit sheet paper include a roll of expandable slit sheet paper wound on an interior core member and mounted on a rod member. The interior core member has a pair of end regions extending beyond the width of said roll of slit sheet paper, whereby the roll of expandable slit sheet paper can be mounted on said rod member for either clockwise or counterclockwise rotation.

In accordance with still another embodiment of the invention, a method of dispensing and expanding expandable slit sheet paper from a device that comprises a roll of expandable slit sheet paper wound on an interior core member having an axial length that is greater than the width of the slit sheet paper that is wound on said interior core member and has at least one core member end region that extends beyond said roll of expandable slit sheet paper, comprises the steps of positioning said interior core member on a rod member, pressing a core end region against the rod member end region and variably applying a frictional resistance to the rotation of said interior core member. The frictional resistance to the rotation of said interior core member on said rod member to a is set at a level such that drawing an end of said roll of expandable slit, sheet paper against said frictional resistance causes said slit sheet paper to expand. The step of variably setting, said frictional resistance to the rotation of said interior core member includes rotating a spring loaded screw member and thereby varying the frictional resistance applied by an elongated member to a core member end region. The spring is positioned between the head of the screw and the elongated member, such that rotation the screw varies the amount of pressure applied by the spring to the elongated member.

In accordance with still another embodiment of the invention, a method of dispensing and expanding expandable slit sheet paper from a device that comprises a roll of expandable slit sheet paper wound on an interior core member having an axial length that is greater than the width of the slit sheet paper that is wound on said interior core member and has at least one core member end region that extends beyond said roll of expandable slit sheet paper, and an elongated member which is hingedly coupled to said support member and a spring, said elongated member having a threaded insert and a screw member passing through said spring and into said threaded insert thereby spring loading said elongated member, wherein the method comprises the steps of positioning said interior core member on a rod member, pressing a core end region against the rod member end region and variably applying a frictional resistance to the rotation of said interior core member. The frictional resistance to the rotation of said interior core member on said rod member to a is set at a level such that drawing an end of said roll of expandable slit sheet paper against said frictional resistance causes said slit sheet paper to expand. The step of variably setting said frictional resistance to the rotation of said interior core member includes rotating a spring loaded screw member and thereby varying the frictional resistance applied by an elongated member to a core member end region.

In accordance with still another embodiment of the invention, a method of dispensing and expanding expandable slit sheet paper from a device that comprises a rod member having four right angle corners and received within a correspondingly dimensioned opening in a support member, said first means for securing said rod member end region to said support member is preferably a threaded member releasably fastening the rod member to the support member, comprising the steps of positioning said slit sheet paper wound on an interior core member on said rod member, rotating said threaded member in a first direction to rigidly fix said rod member to said support member, dispensing said slit sheet paper until the roll of expandable slit sheet paper wound on an interior core member is to be replaced, rotating said threaded member in a second direction to release said rod member from said support member, and removing said interior core member from said rod member.

BRIEF DESCRIPTION OF DRAWINGS

The invention will be described with the accompanying drawings, in which.

DESCRIPTION OF THE INVENTION

Definitions

For the purposes of the present invention the term "cam block" means a lobed device that when rotated provides a pushing action due to its elongated shape.

For the purposes of the present invention the term "lobed" means a structure having a rounded or pointed structure that extends from the main structure.

For the purposes of the present invention the term "hingedly" means that parts or elements are linked together such that an end of one part or element swings or pivots relative to the part with which it is linked.

For the purposes of the present invention the term "connected" mean that two parts are releasably or permanently coupled to each other.

For the purposes of the present invention the term "releasably" means that a component is capable of being separated from another component with which it is couple.

Further information relating to the paper which can be used in the present invention, slit patterns, and the expansion process is found in U.S. Pat. Nos. 6,712,930, 5,538,778, 5,667,871, 5,688,578, 5,782,735, 3,104,197, 3,220,116, 3,266,972; 3,269,393, 3,908,071, 6,024,832, 6,458,447 and 3,908,071, and applications U.S. Ser. No. 14/901,977 WO1984002936A1, US2002/0060034, US 2007/0240841, the disclosures of which are incorporated by reference herein, as though recited in full.

The tensioning device in its preferred embodiment is to be made from wood and further it is to be made from furniture grade plywood normally found within the art. The tensioning device and specifically the tension rod, spring, and thumbscrew are of the same design as found in Non-provisional patent application Ser. No. 15/428,144. The difference in the present invention is that a single yoke is used and the yoke opening is larger than, the paper core and therefore does not contact the paper core. The tension rod presses on the paper core and the paper core rests on a support bar. Thus, there is no need for the yoke to contact the slit sheet roll. In the present invention; the tensioning device has incorporated in it a holding fixture that enables it to be attached to a horizontal support bar. The bar enables the slit shit, roll material to be mounted by means of the support bar passing through the paper core. The edge of the paper core then rests against the holding fixture portion of the tensioning device which, then positions the paper core precisely in place to enable a tension rod to rest in the same fashion as the U.S. application Ser. No. 15/428,144. On the other side of the paper core a removable stop mechanism is preferably provided for preventing the slit sheet roll from moving side to side.

The horizontal support bar is preferably mounted to the holding fixture by a thumbscrew located underneath the holding fixture. Rotation of the thumbscrew for movement upwards presses the support bar to maintain the tensioning device in a fixed position within the holding fixture. Rotating thumbscrew for movement downwards releases the support bar from its fixed position.

Once the tensioning device is firmly in position and the paper is mounted it will function in the exact same fashion as in the nonprovisional application 15/428,144. This feature enables the tension bar to be lifted upward and held in position during the time that no tensioning is required to stretch and feed the slit sheet material. In the instance of the present invention, the support bar adds a degree of friction that reduces and or eliminates the requirement for tensioning with the tension rod. When the roll becomes small enough then tension will be required. This device, called the cam block is preferably made of steel or hard plastic and rotated 90 degrees upward lifting a separate lifting block into position that lifts the tension rod upward thus eliminating tension on the paper core. When tension is required the lifting block is lowered by rotating the cam block downward 90 degrees which lowers the lifting block allowing the tension rod to contact the paper core and apply tension. The rod is then released and the preset tension of the tension rod is then applied to the paper core.

This method of releasing the tension without the requirement of using the thumb screw on the tension bar also allows for easy replacement and removal of the slit sheet roll, Absent this feature the tension rod should be removed to change rolls.

FIGURES

Figure 1:
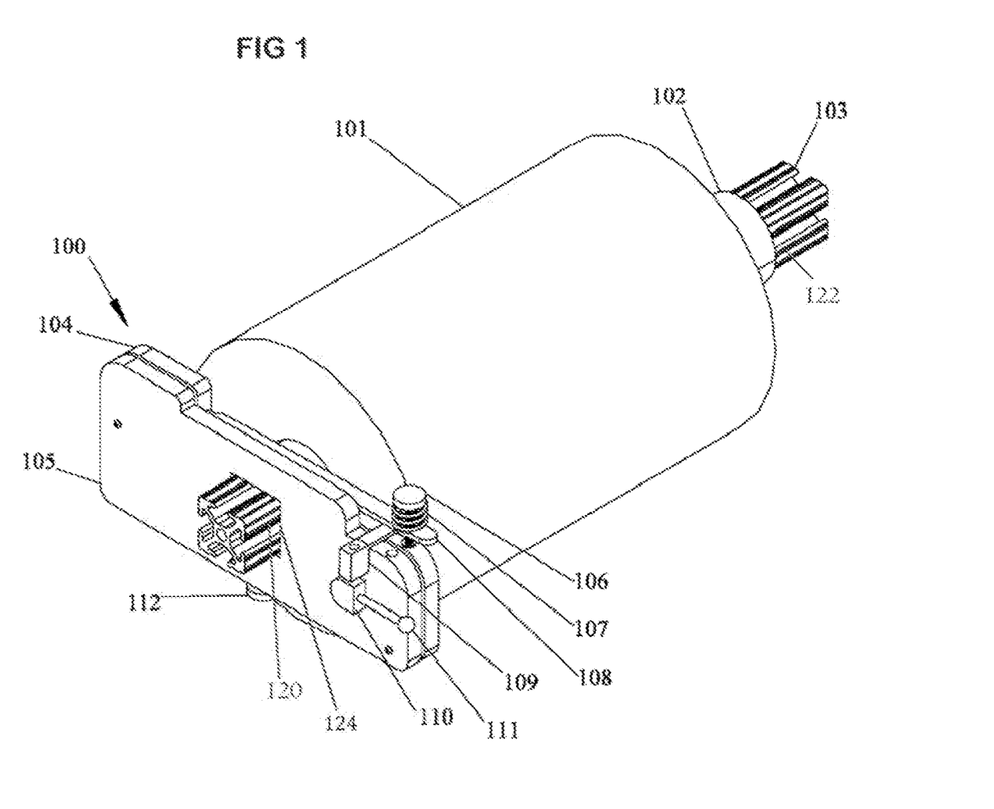
FIG. 1 is a perspective view of the tensioning device.
Figure 2:
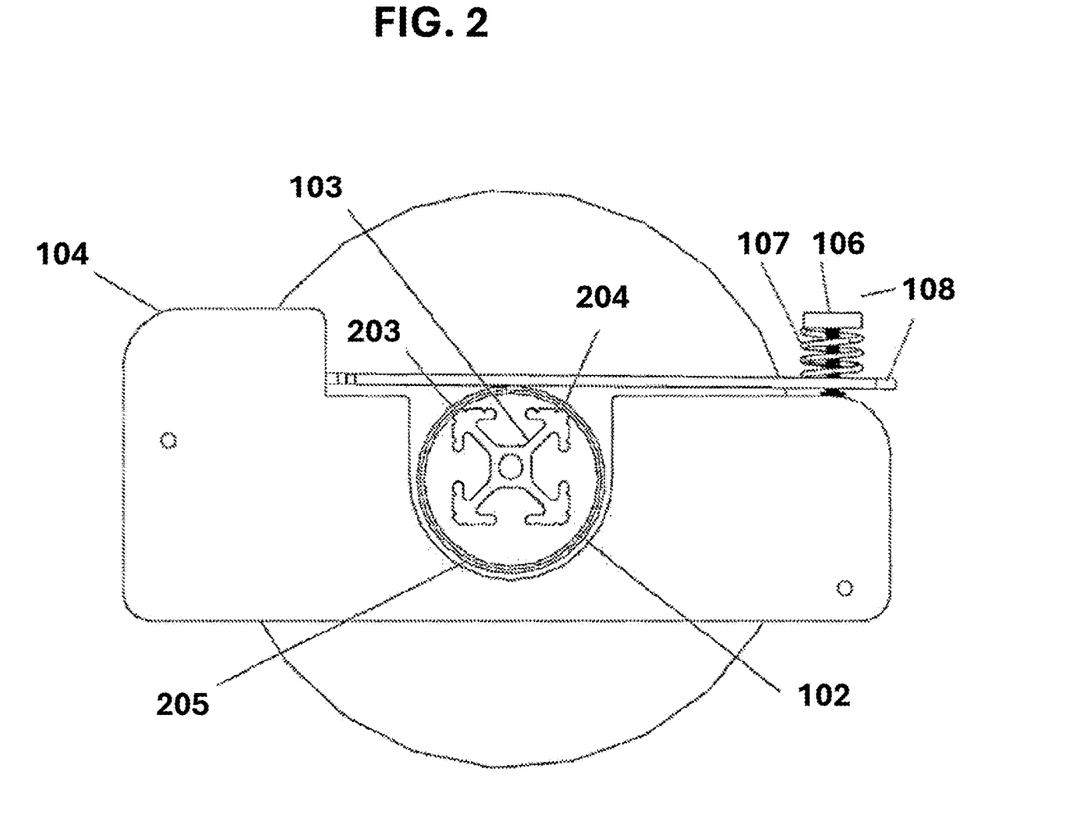
FIG. 2 is a side view of the tensioning device's inner tensioning fixture.

FIG. 1 is a perspective view of the entire tensioning system 100 with loaded slit sheet roll 101 and paper core 102 loaded onto the horizontally positioned support bar 103. The paper core 102 as seen in FIG. 2 is hollow and receives the support bar 103 thus supporting the slit paper roll 101. Tensioning assembly 104 as disclosed in nonprovisional Ser. No. 15/428,144 contains thumbscrew 106 with attached spring 107 pressing on tension rod 108. The tensioning rod 108 is an elongated cantilevered structure carried by the tensioning assembly 104. The tensioning rod is a rigid elongated structural element, such as a beam or a bar, hingedly coupled at, one end to a support with which it is coupled. Holding fixture 105 is attached to tensioning assembly 104 and is attached to the support bar 103 with thumbscrew 112. The lifting block 109 is resting on cam block 110 in the downward position by pushing cam block handle 111 downward. An end 120 of the support bar 103 is positioned in a receiving opening 124 in the holding fixture 105. The opposing end 122 of the support bar 103 can be supported by a second holding fixture, not shown, which can correspond to the holding fixture 105 or the tensioning assembly 104.

FIG. 2 is a side view of the tensioning assembly where the paper core 102 does not contact 104 as shown in open area 205. Support bar 103 contacts paper core 102 and thumbscrew 107 applies pressure to both 103 and 102 simultaneously. Contact between the paper core 102, as seen in FIG. 2, is at two edges 203 and 204 of the paper core supporting bar 103. While the bar receiving opening and the paper core supporting bar 103 are illustrated as being squares, other shapes can be used such as a rectangle having four straight sides and four right angles, and unequal adjacent sides. Alternatively the shape can be of an irregular hexagon that makes contact with the paper core at two or four points and supports the paper core 102. While the core supporting bar 103 can have a polygonal cross-section, the points of contact between a core supporting bar that the paper core (when viewed in cross-section is advantageously limited to four points, and preferably is two points (as seen in FIG. 2, see 203, 204 and 102), for most effective application of pressure to the paper core 102 by the interaction of the tensioning member 108 and the paper a core supporting bar, such as 103 of FIG. 2.

Figure 3:
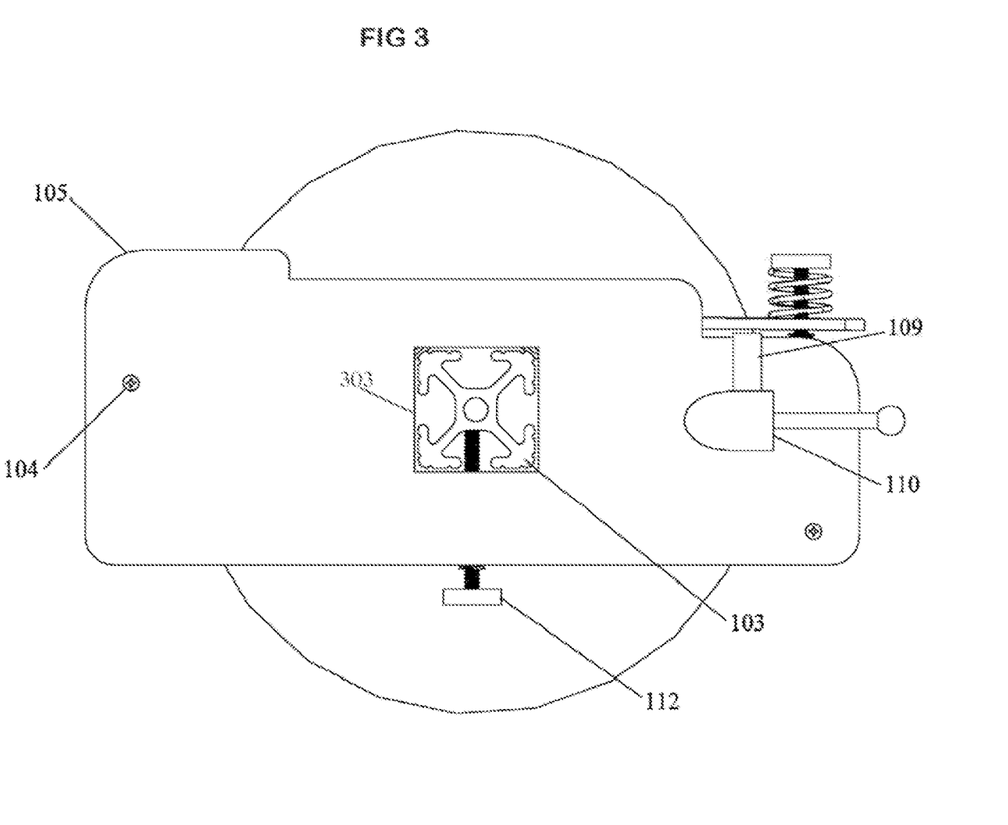
FIG. 3 is a side view of the tensioning device's outer fixture plate with de-tensioning device not actuated.

FIG. 3 is a side view of the holding fixture 105 that shows the screws 104 that attach it to the tensioning assembly, Thumbscrew 112 is screwed upward and pressed against support bar 103 holding it in position within the opening 303 which is configured to conform to the size and shape of the support bar 103. Horizontally positioned support bar 103 supports the paper core 102 (as seen in FIG. 2) and fits into the bar receiving opening 303. The shape of the bar receiving opening 303 conforms to the peripheral configuration of the horizontal, paper core supporting bar 103. Cam block 110 is in the downward position with lifting block 109 resting on it.

Figure 4:
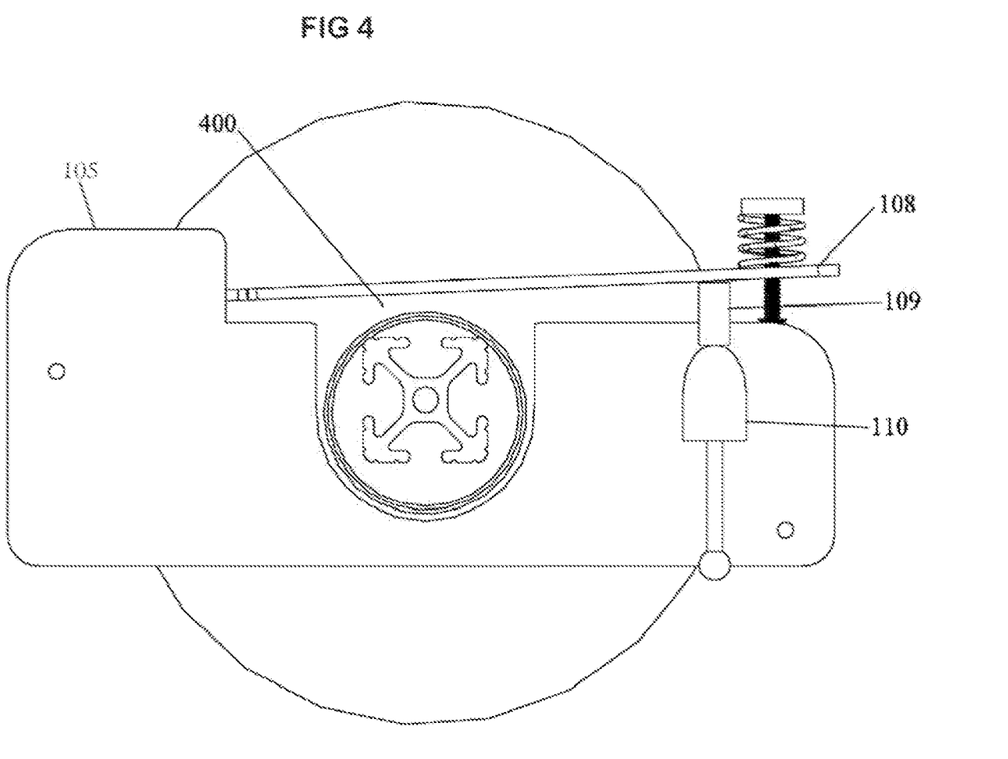
FIG. 4 is a side view of the tensioning device's outer fixture plate with de-tensioning device actuated.

FIG. 4 is a side view showing the cam block 110 rotated upward thus pushing lifting block 109 upward and contacting the tension rod 108 and lifting it beyond the paper core as shown in the open area 400.

Figure 5:
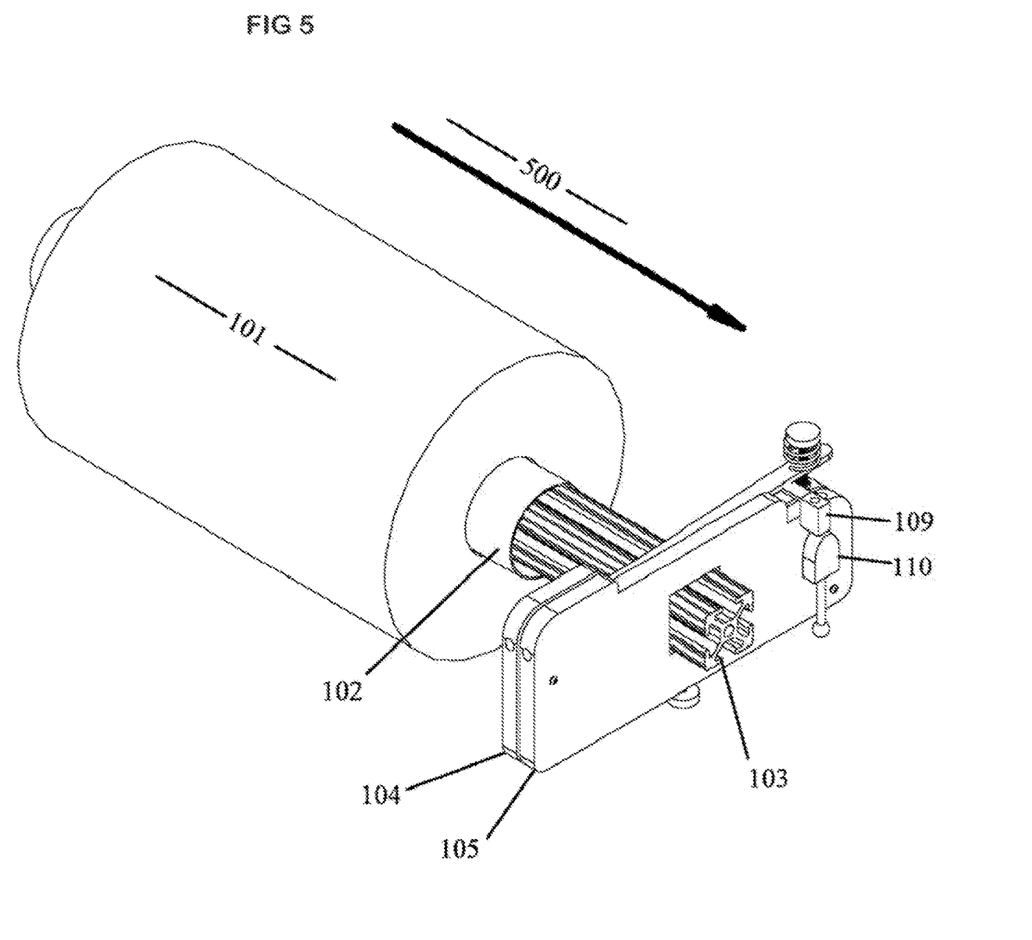
FIG. 5 is a perspective view of the tensioning as the expanded slit sheet roll is being loaded.

FIG. 5 is a perspective view of loading paper roll 101 and paper core 102 onto the support bar 103 with arrow 500 showing the direction of the loading. The edge of the paper core will rest against holding fixture 105 as it passes through the yoke of tensioning assembly 104 while cam block 110 and 109 is in the upward position.

Figure 6:
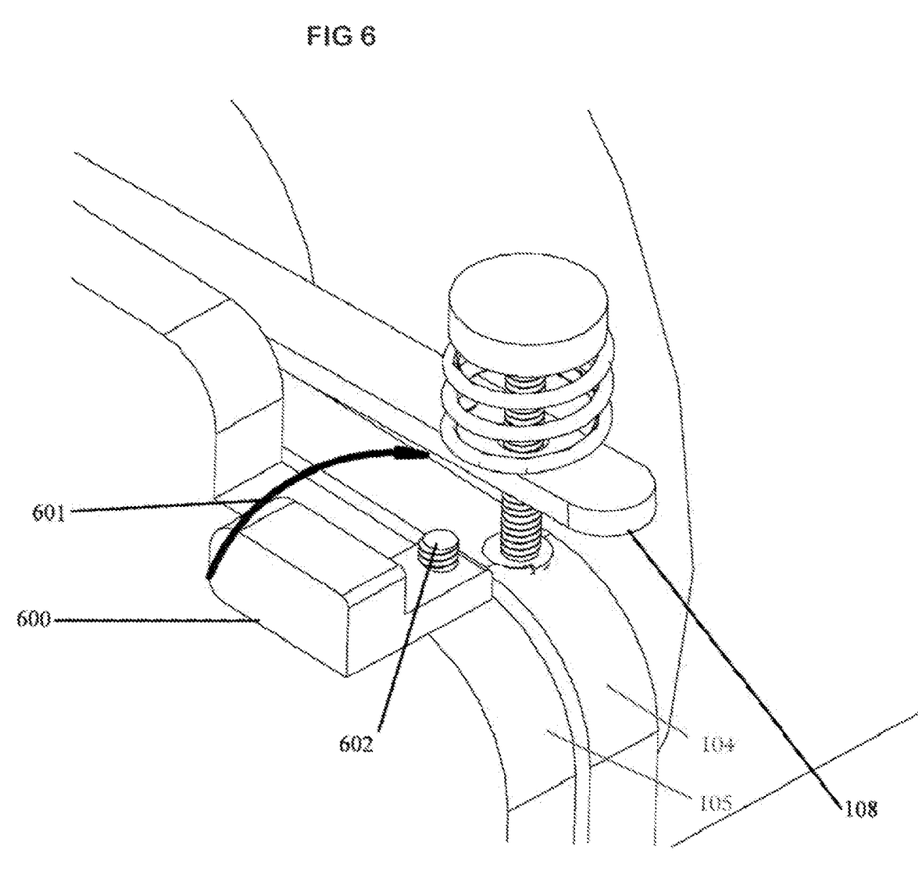
FIG. 6 is a perspective view an alternate de-tensioning device not actuated.

FIG. 6 is a perspective view of the swivel block 600 which, is an alternative lifting mechanism of the tension bar that shows the swivel block 600 in the outward and down position. Tension bar or rod 108 is lifted by hand and the swivel block is rotated in the arrow direction 601 on the axis of the threaded rod 602 to apply the lifting of the tension rod 108.

Figure 7:
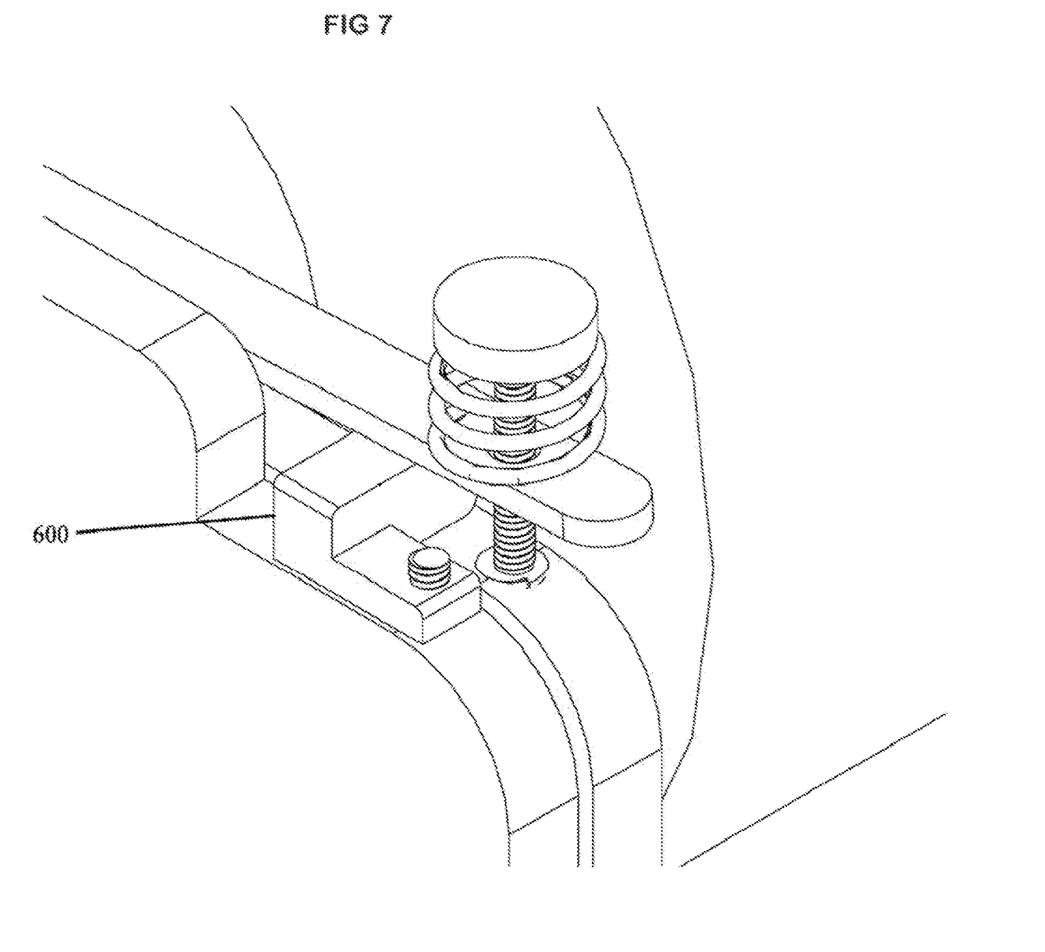
FIG. 7 is perspective view of an alternate de-tensioning device actuated.

FIG. 7 is a perspective view of the alternate swivel block 600 in its lifting position.

The use of individual numerical values is stated as approximations as though the values were preceded by the word "about", "substantially", or "approximately". Similarly, the numerical values in the various ranges specified in this application, unless expressly indicated otherwise, are stated as approximations as though the minimum and maximum values within the stated ranges were both preceded by the word "about", "substantially", or "approximately." In this manner, variations above and below stated ranges can be used to achieve substantially the same results as values within the ranges. As used herein, the terms "about", "substantially", and "approximately" when referring to a numerical value shall have their plain and ordinary meanings to a person of ordinary skill in the art to which the disclosed subject matter is most closely related or the art relevant to the range or element at issue. The amount of broadening, from the strict numerical boundary depends upon many factors. For example, some of the factors which may be considered include the criticality of the element and/or the effect a given<amount of variation will have on the performance of the claimed subject matter, as well as other considerations known to those of skill in the art. As used herein, the use of differing amounts of significant digits for different numerical values is not meant to limit how the use of the words "about", "substantially", or "approximately" will serve to broaden a particular numerical value or range. Thus, as a general matter, "about", 'substantially', or "approximately" broaden the numerical value. Also, the disclosure of ranges is intended as a continuous range including every value between the minimum and maximum values plus the broadening of the range afforded by the use of the term "about", "substantially", or "approximately". Thus, recitation of ranges of values herein are merely intended to serve as a shorthand method of referring individually to each separate value falling within the range, unless otherwise indicated herein, and each separate value is incorporated into the specification as if it were individually recited herein. To the extent that determining a given amount of variation of some the factors such as the criticality of the slit patterns, paper width differential pre- and post-expansion, paper weights and type, as well as other considerations known to those of skill in the art to which the disclosed subject matter is most closely related or the art relevant to the range or element at issue will have on the performance of the claimed subject matter, is not considered to be within the ability of one of ordinary skill in the art, or is not explicitly stated in the claims, then the terms "about", "substantially", and "approximately" as applied to a numerical value should be understood to mean the numerical value plus or minus 15%.

It is to be understood that any ranges, ratios and ranges ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

What is claimed is:

1. In combination:
   A) a device for dispensing expandable slit sheet paper, comprising:
      a rod member adapted to mount an assembly of an interior core member with a roll of expandable slit sheet paper wound on the interior core member,
      said rod member having a first rod member end region,
      a support member,
      said first rod member end region being secured to said support member,
      said rod member having a second rod member end region at an opposite end of said rod member from said first rod member end region,
      said rod member being adapted to receive the assembly of the interior core member with the slit sheet paper wound on the interior core member,
      a pressing member that is movable to apply a frictional resistance to inhibit rotation of the core member, and a spring arranged to apply a spring force against said pressing member,
      further including a manually adjusted member that is arranged to apply a pressure against said spring such as to adjust the spring force applied by the spring against said pressing member; and
   B) an assembly of an interior core member with a roll of expandable slit sheet paper wound on the interior core member;
      wherein said interior core member is a hollow cylindrical tube made with paper,
      wherein said rod member extends through an interior of said hollow cylindrical tube, and
      wherein said pressing member is configured to contact a cylindrical surface of said hollow cylindrical tube such as to apply a pressure force against said cylindrical surface of said hollow cylindrical tube to apply said frictional resistance to inhibit rotation of the core member; and
      wherein said rod member includes two elongated portions extending parallel to an axis of and entirely through a length of said core member, said two elongated portions being adapted to support the core member at two respective points of contact at opposite sides of said axis of the core member.

2. The combination of claim 1, further including a screw passing through said spring, and said manually adjusted member being rotatable to vary the frictional resistance.

3. The combination of claim 1, wherein said manually adjusted member is configured to be rotated to manually adjust the spring force.

4. The combination of claim 1, further comprising threads for adjusting a position of the manually adjusted member upon rotation of the manually adjusted member.

5. The combination of claim 1, further including said rod member connected to said support member with a screw engagement.

6. The combination of claim 1, further comprising an end region of said interior core member extending beyond a width of the roll of slit sheet paper.

7. The combination of claim 1, wherein said second rod member end region is adapted to extend outward past an end of the assembly of said roll of slit sheet paper and the core member, and further including a stop member adapted to prevent the assembly from moving side to side on said rod member.

8. The combination of claim 1, further comprising each end region of said interior core member extending beyond a width of the roll of expandable slit sheet paper an amount of at least one inch from said roll of expandable slit sheet paper.

9. The combination of claim 1, wherein said assembly of the interior core member with the roll of expandable slit sheet paper wound on the interior core member is mounted on said rod member.

10. The combination of claim 1, wherein said second rod member end region is secured to another support member.

11. A method for dispensing and expanding expandable slit sheet paper using the combination of claim 1, comprising:
    positioning the assembly of the interior core member with a roll of expandable slit sheet paper wound on the interior core member on said rod member,
    setting the frictional resistance to the rotation of said core member on said rod member, and
    drawing an end of said roll of expandable slit sheet paper against said frictional resistance and expanding said slit sheet paper.

12. The method of claim 11, further including setting the frictional resistance by adjusting the compression of the spring to apply a pressure to said pressing member.

13. The method of claim 12, further including applying friction directly upon a surface of said core member with said two elongated portions that form ridge portions that extend parallel to the axis of the rod member.

14. The combination of claim 1, further including a stop member that prevents the assembly from moving sideways in an axial direction.

15. The combination of claim 1, wherein said second rod member end region is free from securement to another support member.

16. The combination of claim 1, wherein the pressing member is fixed in relation to the rod member.

17. The combination of claim 16, wherein the pressing member is attached to the rod member.

18. The combination of claim 16, wherein the pressing member is attached to the rod member via a holding fixture.

19. The combination of claim 1, further including said two elongated portions forming corner portions that extend parallel to the axis of the rod member, at least some of said plurality of corner portions being configured to apply friction directly upon a surface of the inside of the interior of said core member.

20. The combination of claim 19, wherein said rod member includes four corner portions.

21. The combination of claim 20, wherein said four corner portions are arranged to be equidistantly spaced around the interior of said core member.

22. The combination of claim 19, wherein said corner portions are elongated ridges that extend parallel to the axis of the rod member.

23. The combination of claim 19, wherein said corner portions extend outwardly from the periphery of said rod member.

24. The combination of claim 1, wherein said spring is a coil spring.

25. The combination of claim 24, wherein said manually adjusted member is arranged to apply a pressure upon a first part of said spring and said pressing member is arranged to receive pressure from said spring from a second part of said spring.

26. The combination of claim 25, wherein said manually adjusted member is configured to adjust a distance between said manually adjusted member and said pressing member such as to adjust an amount of compression of the spring, whereby adjusting the spring force from the spring toward the pressing member.

27. The combination of claim 1, wherein said manually adjusted member is arranged to impart a pressure toward a first part of said spring, and said pressing member is arranged to receive a pressure imparted from a second part of said spring.

28. The combination of claim 27, wherein said manually adjusted member is configured to adjust a distance between said manually adjusted member and said pressing member such as to adjust an amount of compression of the spring, whereby adjusting the spring force from the spring imparted against the pressing member.

29. The combination of claim 27, wherein said manually adjusted member is configured to be rotated to manually adjust the spring force via threads.

30. The combination of claim 29, wherein said manually adjusted member is a thumbscrew.

31. The combination of claim 1, wherein said manually adjusted member is configured to be rotated to manually adjust the spring force via threads.

32. The combination of claim 1, wherein said pressing member has a side arranged to press directly upon said cylindrical surface of the core member.

33. The combination of claim 32, wherein a contact region of said cylindrical surface of the core member is radially aligned along a center axis of said core member with a contact region of said side of said pressing member.

34. The combination of claim 33, wherein points of contact of said contact region of said cylindrical surface of said core member move tangentially with respect to corresponding points of contact of said contact region of said side of said pressing member.

35. The combination of claim 32, wherein said rod member is configured to support said core member at said two points distributed around the axis of said core member.

36. The combination of claim 1, wherein said cylindrical surface of the core member is an outer periphery of the core member.

37. The combination of claim 36, wherein a side of said pressing member arranged to press upon the outer periphery of the core member is substantially planar.

38. The combination of claim 36, wherein a side of said pressing member arranged to press upon the outer periphery of the core member is substantially planar at a point of contact with said outer periphery of said core member.

39. The combination of claim 1, wherein said pressing member is adapted to apply said frictional resistance that inhibits rotation of the core member by a substantially planar side of said pressing member arranged to press an outer periphery of the core.

40. The combination of claim 1, wherein said pressing member is adapted to apply said frictional resistance to inhibit rotation of the core member by said pressing member pressing a side surface directly upon an outer periphery of said core member.

41. The combination of claim 1, wherein said two elongated portions of said rod member are configured to contact said core member at two points distributed around the axis of said core member.

42. The combination of claim 1, further including:
said manually adjusted member including a knob;
a threaded shaft connected to the knob; and
said spring being captured by the threaded shaft,
wherein rotation of the knob in a first direction compresses the spring and rotation of the knob in an opposite direction decompresses the spring; and
wherein compression and decompression of the spring correspondingly increases and decreases a force required to rotate the core member.

43. The combination of claim 42, wherein said threaded shaft passes through said spring.

44. The combination of claim 42, wherein the knob is configured to be manually rotated.

45. A method for dispensing and expanding expandable slit sheet paper using the device of claim 42, comprising:
supporting the assembly of the core member with the roll of expandable slit sheet paper wound on the core member upon said rod member,
setting the frictional resistance to the rotation of said cylindrical core member on said rod member, and
manually pulling an end of said roll of expandable slit sheet paper against said frictional resistance and expanding said slit sheet paper.

46. The method of claim 45, further including setting the frictional resistance by rotating the knob to compress or decompress the spring.

47. The method of claim 45, further including applying friction directly upon an interior surface of the core member with said two elongated portions that extend parallel to the axis of the rod member.

48. The combination of claim 42, wherein said two elongated portions form corner portions that extend parallel to the axis of the rod member, at least some of said plurality of corner portions being configured to apply friction directly upon an interior surface of the cylindrical core.

49. The combination of claim 48, wherein said rod member includes four corner portions.

50. The combination of claim 49, wherein said four corner portions are equidistantly spaced around a perimeter of said rod member.

51. The combination of claim 48, wherein said corner portions are elongated ridges that extend parallel to the axis of the first support.

52. The combination of claim 48, wherein said corner portions extend outwardly from a periphery of said rod member.

53. The combination of claim 42, wherein said spring extends around said threaded shaft.

54. The combination of claim 42, wherein said knob is adapted to impart pressure towards a first part of said spring, and said pressing member is arranged to receive pressure imparted from a second part of said spring.

55. The combination of claim 54, wherein said knob is configured to adjust a distance between said knob and said pressing member to adjust an amount of compression of the spring, whereby adjusting a spring force from the spring imparted towards the pressing member.

\* \* \* \* \*